May 19, 1970 — R. A. TYLER — 3,513,331
SAMPLING CIRCUIT INCLUDING A PAIR OF GATES FOR SUCCESSIVELY SAMPLING SIGNALS
Filed Aug. 5, 1966 — 3 Sheets-Sheet 1
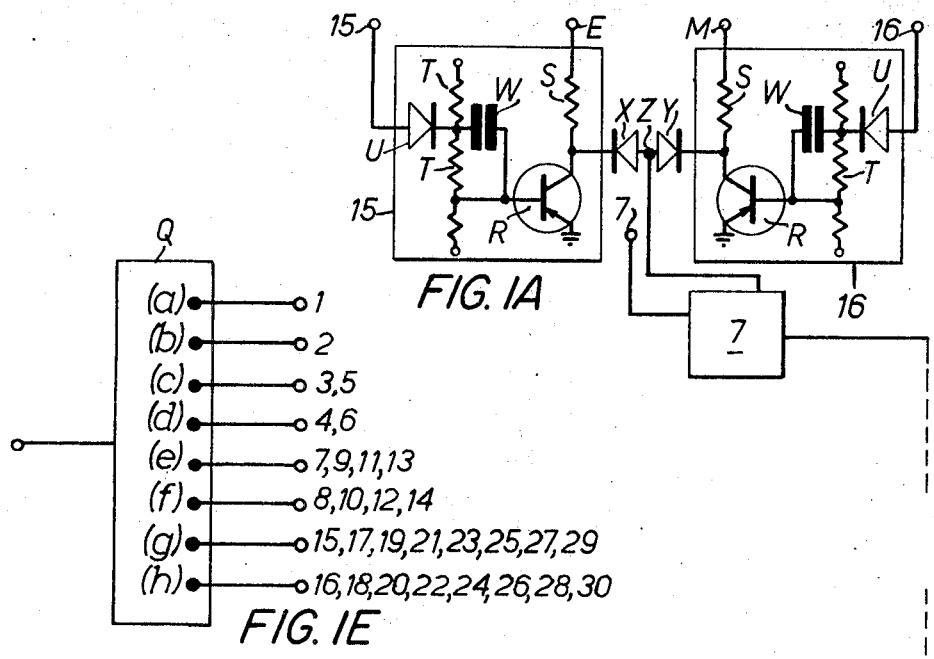
FIG. 1A
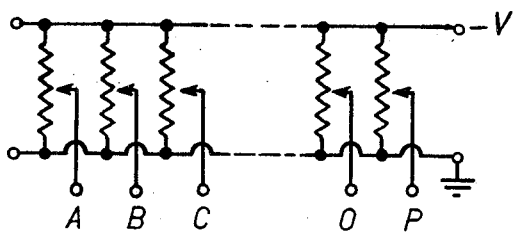
FIG. 1E
FIG. 1D
FIG. 1B
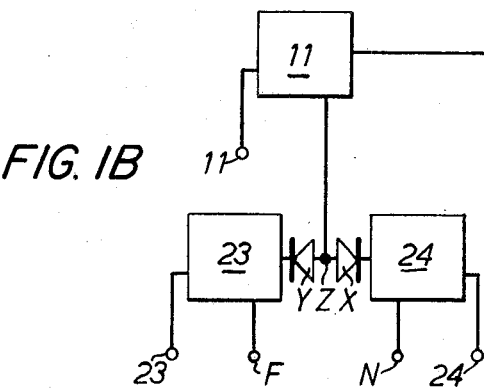
INVENTOR
Ronald Arthur Tyler
BY
Baldwin, Wight, Diller & Brown
ATTORNEYS INVENTOR
Ronald Arthur Tyler
BY
Baldwin Wight Diller & Brown
ATTORNEYS United States Patent Office 3,513,331
Patented May 19, 1970

3,513,331
SAMPLING CIRCUIT INCLUDING A PAIR OF GATES FOR SUCCESSIVELY SAMPLING SIGNALS
Ronald Arthur Tyler, Essex, England, assignor to The Marconi Company Limited, English Electric House, London, England, a British company
Filed Aug. 5, 1966, Ser. No. 570,635
Claims priority, application Great Britain, Sept. 10, 1965, 38,845/65
Int. Cl. H03k 17/00
U.S. Cl. 307—241                                    4 Claims

ABSTRACT OF THE DISCLOSURE

A sampling circuit having a number of pairs of gates for successively sampling a plurality of signals is disclosed. Each gate contains a transistor with its emitter at anchored potential. The signals to be sampled are applied to respective collectors of the transistors through resistors. A predetermined bias potential is applied to the bases of the pair of transistors and two switching voltage levels are superimposed on the bias. A pair of oppositely sensed diodes are connected between the collectors of the pair of transistors. An output appears at the junction of the two diodes which may, in turn, be connected to the collector of another transistor associated with a further pair of gates.

---

Figure 1C:
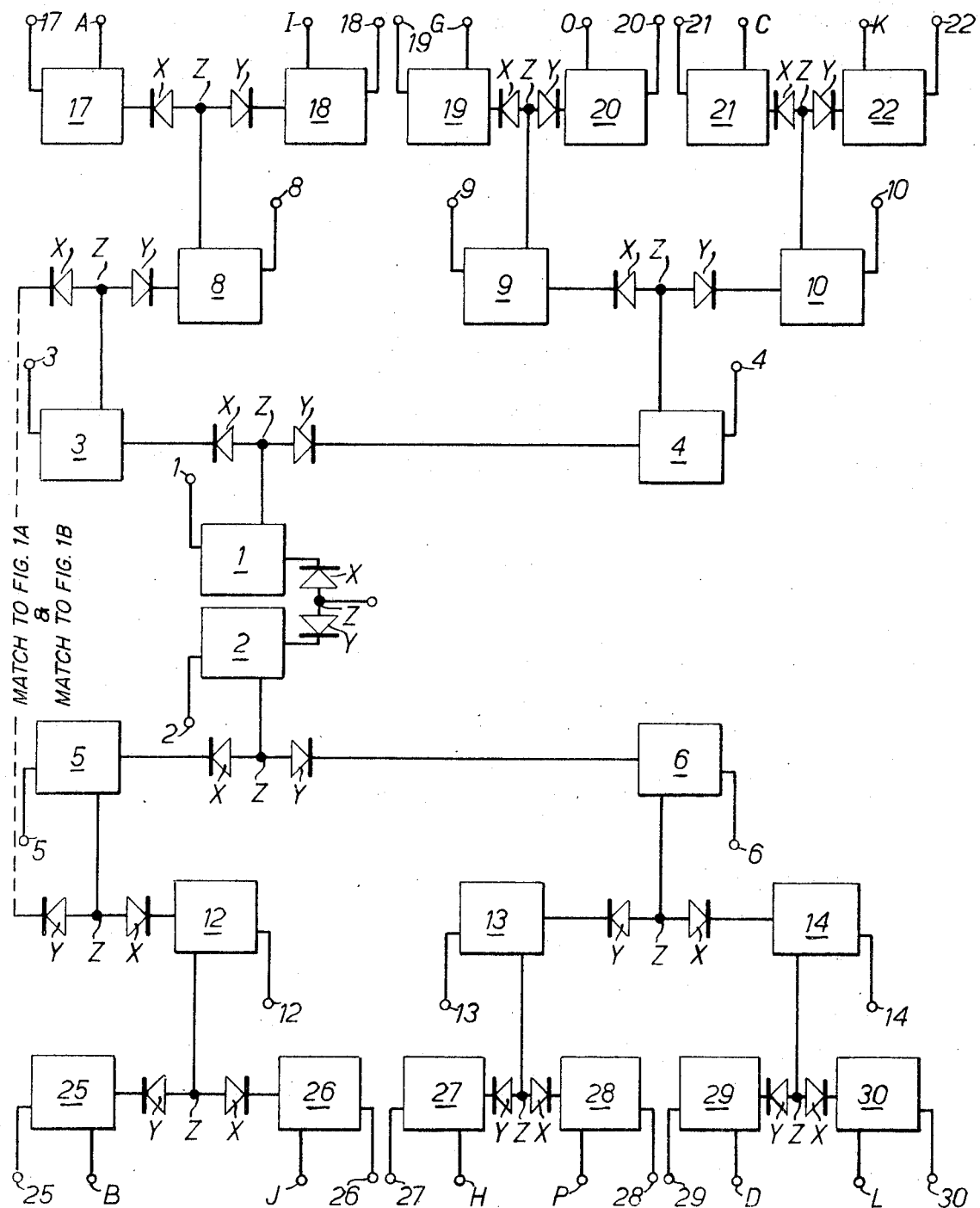

This invention relates to sampling circuits and has for its object to provide improved and relatively simple signal or voltage sampling circuits capable of sampling desired numbers (which may be very large) of signals or voltages successively at very high speed if it is desired to do so. The said signals or voltages may be A.C., D.C., or A.C. superimposed upon D.C., the invention being of broad application wherever successive sampling of signals or voltages appearing at a number of points is required. Thus, for example, the invention may be used to display or generate a stepped wave form made up of the successive samples or to operate an alarm or safety device if any of the samples exceeds a predetermined limiting value or goes outside predetermined limits.

According to this invention a sampling circuit for successively sampling a plurality of signals or voltages comprises at least a pair of gates each containing a transistor with its emitter at anchored potential (preferably earth), means for applying a different one of the signals or voltages to be sampled to the collector of the transistor in a different one of the pair of gates, means in each gate for applying a predetermined bias potential to the base of the transistor thereof so as normally to cut off said transistor, a pair of oppositely sensed diodes connected between the collectors of the transistors of said gates and means for successively superimposing in turn on a bias applied to the base of the transistor in each gate two switching voltage levels whereby the transistors are alternately rendered conductive and voltages corresponding to those applied to the transistor collectors alternately appear at the junction point of the diodes.

Preferably each gate comprises a potential dividing resistance connected across a D.C. source of predetermined potential, an input diode through which the switching voltage levels for said gate are in turn applied to an intermediate point on said resistance, a connection between another intermediate point on said resistance and the base of said transistor, a condenser between said intermediate points, and a resistance through which the voltage to be sampled by said gate is applied to the transistor collector.

It will be seen that, with this invention, the gates of the pair alternately select each of the two signals or voltages applied thereto and it will be noted that the transistors in the gates do not themselves alternately pass said signals or voltages to the output point (the junction point of the oppositely sensed diodes) of the pair but, on the contrary, alternately connect said signals or voltages to earth (or some other suitable point of anchored potential). This is important to the attainment of fast and satisfactory switching and allows the transistors to be used to best advantage.

A preferred embodiment comprises half the number of first pairs of gates as there are signals or voltages to be sampled; means for applying to each of the gates of said first pairs a different one of the signals or voltages to be sampled; means for applying to all the corresponding gates of said first pairs a switching voltage wave of predetermined frequency and to all the other gates of said first pairs a switching voltage wave of the same frequency but in phase opposition thereto; half the number of second pairs of gates as there are first pairs; means for applying to each of the gates of said second pairs the signal or voltage selected by a different one of said first pairs; means for applying to all the corresponding gates of said second pairs a switching voltage wave of double predetermined frequency and to all the other gates of said second pairs a switching voltage wave of said double frequency but in phase opposition thereto; and so on until a selected output signal is produced by selection by a final pair of gates one of which receives a voltage or signal derived by successive stages of selection from half of the first pairs of gates and the other of which receives a voltage or signal similarly derived by successive stages of selection from the other half of said first pairs of gates.

Preferably the switching voltage waves of the required frequencies are derived from a frequency dividing counter device.

Figure 2:
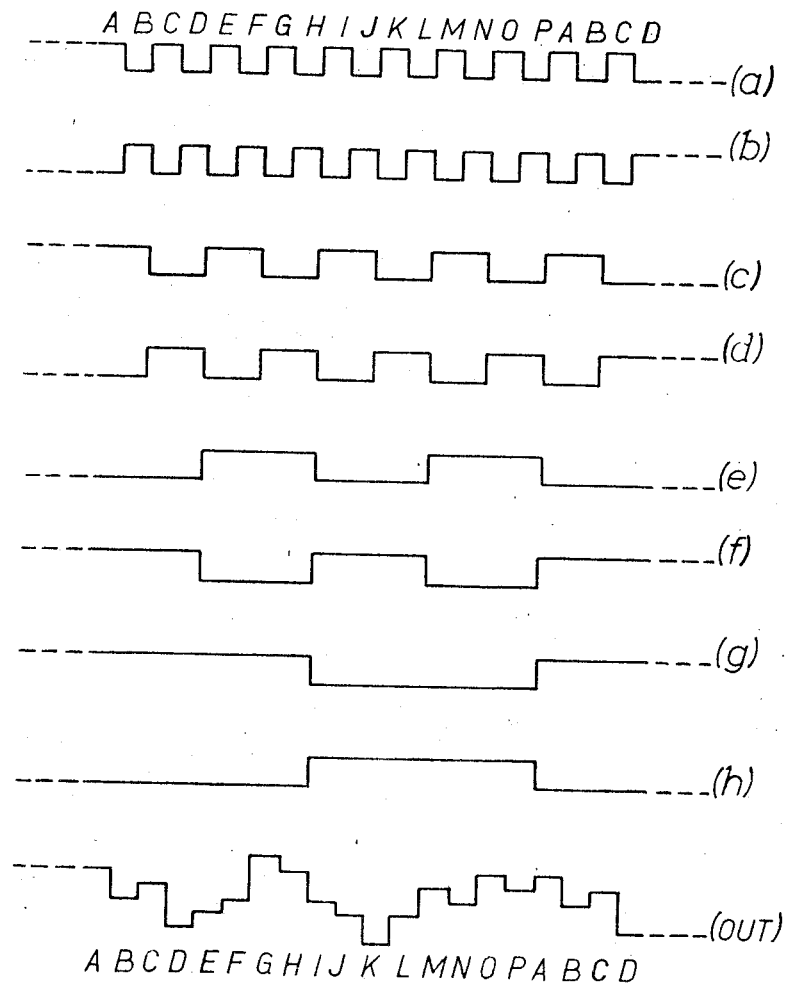

The invention is illustrated in and further explained in connection with the accompanying drawings in which, FIGS. 1A–1E are a block diagram of one embodiment and FIG. 2 is an explanatory graphical figure.

For simplicity of description the embodiment of FIGS. 1A–1E is illustrated as a stepped wave form or staircase voltage generator in which individually adjustable D.C. voltages are sampled in succession to provide a stepped wave form the values of the steps in which are determined by the adjusted values of the said D.C. voltages. However it is to be understood that this particular application of the invention may be applied to any of a variety of cases in which successive sampling of signals or voltage is required. Thus, for example, it could be used to sample high frequency or other A.C. voltages superimposed upon D.C. or to sample D.C. voltages derived from high frequency or other A.C. voltages. Again, for example, it could be employed as a test apparatus for automatically testing an equipment having a number of points at which appear voltages, none of which exceed a predetermined value so long as the equipment is working safely. By employing an apparatus in accordance with this invention successively to sample the voltages at these points, or voltages derived therefrom, and providing safety or alarm means to be automatically actuated if the output from the apparatus exceeds a predetermined value, an alarm or safety control action will be automatically obtained if the equipment ceases to operate safely. Again, the embodiment illustrated in FIGS. 1A–1E is designed successively to sample sixteen voltages but, as will be obvious later, the invention can be used to sample smaller or greater numbers of voltages.

Referring to the drawings the sixteen voltages to be sampled are exemplified as individually adjustable voltages derived from the sliders of sixteen potentiometers (of which only five are shown in FIG. 1D) and which appear at the terminals A, B, . . . O, P. In order to simplify FIGS. 1A–1C terminals which are electrically united with the lettered terminals shown in FIG. 1D are indicated by the same reference letters or numbers. Thus the two terminals referenced A are connected together, as are the two terminals referenced B, the two terminals referenced 17 and the two terminals referenced 25 . . . and so on.

The apparatus comprises thirty switching gates, identified by the number references 1 to 30. They are all alike and accordingly only two, namely 15 and 16, are shown in detail. Each gate has two input terminals. Of these one, which is identified in the cases of gates 15 to 22 inclusive and 23 to 30 inclusive by a capital letter, receives a D.C. voltage and the other, identified by a number reference which is the same as the number reference of the gate in question, receives a switching voltage wave from a frequency dividing counter device Q, shown in FIG. 1E, having eight output terminals, referenced (a) to (h) at which appear one or other of eight switching wave forms as represented by the correspondingly referenced lines of FIG. 2. Each of these wave forms changes, between two levels as shown in FIG. 2 lines (a) to (h).

Each gate comprises a normally cut-off transistor R (FIG. 1A) the emitter of which is earthed and the collector of which is connected to the D.C. input terminal through a resistance S; a potential dividing resistance T connected across a potential source as indicated; a diode U connected as shown between a tap on said resistance T and the switching voltage input terminal of the gate; a second, more positive tap connected to the base of the transistor; and a condenser W connected between the two taps.

The gates are associated with one another in pairs, the gates of each of a pair having the collectors of their transistors R connected together through two oppositely sensed diodes X and Y the junction point of which is referenced Z. Consider the case of the pair of gates 15 and 16 and suppose the transistor of the former to be switched into the conductive state and that of the latter to be cut off. Then the D.C. voltage applied at E will be put substantially to earth and substantially the D.C. voltage applied at M will appear at the junction point Z between the two diodes X and Y which interconnect the two gates. If the transistor of gate 16 is switched into conduction and that in gate 15 is cut off the voltage appearing at Z will be substantially that applied at E. Thus by alternately switching the transistors of two gates of a pair into conduction, the D.C. voltages applied to those gates will be alternately selected, the voltage selected at any time (at point Z) being substantially that applied to the gate whose transistor is cut off.

The gates 15 and 16, 17 and 18, 19 and 20, 21 and 22, 23 and 24, 25 and 26, 27 and 28, 29 and 30 are paired as just described and the voltages selected by two of these pairs are fed as D.C. input voltages to the gates of a further pair of gates. Thus there is a further pair of gates 7 and 8 of which gate 7 receives its D.C. input voltage from the point Z between gates 15 and 16 and gate 8 receives its D.C. input voltage from the point Z between gates 17 and 18. Similarly the further pair of gates 9 and 10 is associated with gates 19 to 22 inclusive; the further pair of gates 11 and 12 is associated with gates 23 to 26 inclusive; and the further pair of gates 13 and 14 is associated with gates 27 to 30 inclusive.

Each further pair of gates is similarly associated with one or other of an additional pair of gates and provides its selected voltage as D.C. input thereto. Thus gate 3 receives as its input voltage that selected by gates 7 and 8; gate 4 receives the D.C. voltage selected by gates 9 and 10; gate 5 receives the voltage selected by gates 11 and 12; and gate 6 receives the voltage selected by gates 13 and 14.

The two additional pairs of gates are similarly associated with a final pair of gates 1 and 2 of which the former receives the D.C. voltage selected by gates 3 and 4 and the latter receives the D.C. voltage selected by gates 5 and 6. The final output voltage, selected by the final pair of gates 1 and 2 from the two D.C. inputs thereto, appears at the final output terminal OUT.

The manner in which the gates are switched will be apparent from FIG. 2. A square or other suitable wave form as shown by line (a) of FIG. 2 and of predetermined frequency, for example 32 kc./s., is applied as the master input to the counter device Q, shown in FIG. 1E, which is of known design and construction and produces at its output terminals (a) to (h) the switching wave forms shown in lines (a) to (h) respectively of FIG. 2. Each of these wave forms changes between two levels the upper of which, when applied to one of the gates illustrated in FIGS. 1A–1C, will leave the transistor of that gate cut-off and the lower of which, when applied to said gate, will render that transistor conductive. Switching wave form (a) is the same as the input wave form to the device Q and is applied to gate 1; wave form (b) which is in phase opposition to (a) is applied to gate 2; wave form (c), is half the frequency of (a) and is applied to gates 3 and 5; wave form (d) which is in phase opposition to (c) is applied to gates 4 and 6; wave form (e) is half the frequency of (c) and is applied to gates 7, 9, 11 and 13; wave form (f), which is in phase opposition to (e) is applied to gates 8, 10, 12 and 14; wave form (g) is half the frequency of (e) and is applied to gates 15, 17, 19, 21, 23, 25, 27 and 29; and wave form (h) which is in phase opposition to (g) is applied to the remaining gates 16, 18, 20, 22, 24, 26, 28 and 30. Accordingly there will appear at the output terminal OUT a wave form as exemplified by the line OUT of FIG. 2 and consisting of sixteen successive samples, each lasting for a half cycle of the wave form (a), of the voltages to which the potentiometer sliders connected to terminals A, B, . . . O, P are adjusted. The counter device is arranged in known manner (not shown) to reset itself at the end of the sixteenth sample so that a fresh sequence of sixteen samples are taken. In FIG. 2 the times in which the different samples appear at the output are indicated by the letter sequences A to P at the top and bottom of the figure.

The total number of gates is chosen to suit the number of samples to be taken. Thus, if eight samples are required there would be fourteen gates—such as the gates 15, 16, 17, 18, 7, 8, 3, 23, 24, 25, 26, 12, 11 and 5, the gates 3 and 5 being paired to provide the final output—and the counter device would be arranged to give only the outputs (a), (b), (c), (d), (e) and (f). Similarly if 32 samples were required there would be 62 gates and the counter device would have two further outputs in phase opposition.

As above stated the signals to be sampled could be A.C., D.C. and A.C. superimposed upon D.C. If the signals to be sampled are A.C. or A.C. superimposed upon D.C. they would be merely applied each through a blocking condenser to the appropriate one of the lettered terminals A, B, C, . . . P and the potentiometer sliders connected to these terminals could be replaced by fixed taps on the appropriate resistances.

Although in the described and illustrated embodiment the master input to the counter device Q is a regular periodic squared wave form (of 32 kc./s. in the particular example given) alternating between two predetermined D.C. levels, it is not essential that said master input be of regular periodic nature. If it is, the sampling will, of course, be also regular periodic and cyclic. The master input can however be quite irregular, i.e. non-periodic, so long as it alternates between the said two levels, e.g. it might consist, for example, of manually switched and arbitrarily timed alternations between the two predetermined D.C. levels provided, of course, that the counter device Q itself is of a type which will retain any "counting" position which it has attained. With such an arrangement the timing of the taking of the successive samples will be determined by the times at which the successive manual switching operations are performed.

I claim:

1. A sampling circuit for successively sampling a plurality of signals or voltages, said circuit comprising at least a pair of gates each containing a transistor with its emitter at anchored potentail, means for applying a different one of the signals or voltages to be sampled to the collector of the transistor in a different one of the pair of gates, means in each gate for applying a predetermined bias potential to the base of the transistor thereof, a pair of oppositely sensed diodes connected between the collectors of the transistors of said gates, and means for successively superimposing alternatively on said predetermined bias potential applied to the base of the transistor in each gate two switching voltage levels for alternately rendering the transistors conductive whereby signals or voltages corresponding to those applied to the transistor collectors alternately appear at the junction point of the diodes.

2. A sampling circuit as claimed in claim 1 wherein each gate comprises a potential dividing resistance connected across a D.C. source of predetermined potential; an input diode through which the switching voltage levels for said gate are in turn applied to an intermediate point on said resistance, a connection between another intermediate point on said resistance and the base of said transistor, a condenser between said intermediate points, and a resistance through which the voltage to be sampled by said gate is applied to the transistor collector.

3. A sampling circuit as claimed in claim 1 and comprising half the number of first pairs of gates as there the signals or voltages to be sampled; means for applying to each of the gates of said first pairs a different one of the signals or voltages to be sampled; means for applying to all the corresponding gates of said first pairs a switching voltage wave of predetermined frequency and to all the other gates of said first pairs a switching voltage wave of the same frequency but in phase opposition thereto; half the number of second pairs of gates as there are first pairs; means for applying to each of the gates of said second pairs the signal or voltage selected by a different one of said first pairs; means for applying to all the corresponding gates of said second pairs a switching voltage wave of double said predetermined frequency and to all the other gates of said second pairs a switching voltage wave of said double frequency but in phase opposition thereto; and so on until a selected output signal is produced by selection by a final pair of gates one of which receives a voltage or signal derived by successive stages of selection from half of the first pairs of gates and the other of which receives a voltage for signal similarly derived by successive stages of selection from the other half of said first pairs of gates.

4. A sampling circuit as claimed in claim 3 wherein the switching voltage waves of the required frequencies are derived from a frequency dividing counter device.

References Cited

UNITED STATES PATENTS

| | | | |
|---|---|---|---|
| 3,089,091 | 5/1963 | Lindenthal | 307—253 X |
| 3,158,692 | 11/1964 | Gerkensmeier | 328—154 X |
| 3,233,121 | 2/1966 | Chou | 307—243 |
| 3,330,968 | 7/1967 | Loyen | 307—253 X |

JOHN S. HEYMAN, Primary Examiner

J. D. FREW, Assistant Examiner

U.S. Cl. X.R.

307—242, 243, 253, 244; 328—104, 151, 154